(12) United States Patent
Wise et al.

(10) Patent No.: US 8,107,161 B2
(45) Date of Patent: Jan. 31, 2012

(54) CHIRPED PULSE FIBER AMPLIFIER

(75) Inventors: Frank W. Wise, Ithaca, NY (US); Shian Zhou, Ithaca, NY (US); Lyuba Kuznetsova, Cambridge, MA (US); Chin Yu Chong, Ithaca, NY (US)

(73) Assignee: Cornell University, Ithaca, NY (US)

( * ) Notice: Subject to any disclaimer, the term of this patent is extended or adjusted under 35 U.S.C. 154(b) by 710 days.

(21) Appl. No.: 11/911,410

(22) PCT Filed: Apr. 14, 2006

(86) PCT No.: PCT/US2006/014210
§ 371 (c)(1),
(2), (4) Date: Aug. 18, 2008

(87) PCT Pub. No.: WO2006/113507
PCT Pub. Date: Oct. 26, 2006

(65) Prior Publication Data
US 2009/0128892 A1 May 21, 2009

Related U.S. Application Data

(60) Provisional application No. 60/671,078, filed on Apr. 14, 2005.

(51) Int. Cl.
*H04B 10/17* (2006.01)

(52) U.S. Cl. ...................................... 359/341.1; 372/25

(58) Field of Classification Search .................. 372/25; 359/341.1
See application file for complete search history.

(56) References Cited

U.S. PATENT DOCUMENTS

| | | | |
|---|---|---|---|
| 5,847,863 A * | 12/1998 | Galvanauskas et al. | ... 359/341.3 |
| 5,880,877 A * | 3/1999 | Fermann et al. | ......... 359/341.31 |
| 6,885,683 B1 * | 4/2005 | Fermann et al. | ................ 372/25 |
| 2003/0156605 A1 * | 8/2003 | Richardson et al. | ............ 372/25 |
| 2004/0263950 A1 * | 12/2004 | Fermann et al. | .............. 359/333 |
| 2006/0207976 A1 * | 9/2006 | Bovatsek et al. | ........ 219/121.69 |

OTHER PUBLICATIONS

Zhou et al. "Compensation of nonlinear phase shifts with third-order dispersion in short-pulse fiber amplifiers", Optics Express vol. 13, No. 13, pp. 4869-4877 (Jun. 2005).*
Shah et al., "High energy femtosecond Yb cubicon fiber amplifier", Optics Express, vol. 13, No. 12, pp. 4717-4722 (Jun. 2005).*

* cited by examiner

*Primary Examiner* — Eric Bolda
(74) *Attorney, Agent, or Firm* — William A. Blake

(57) ABSTRACT

A short-pulse fiber amplifier system (10) is designed so that nonlinear phase shifts and third-order dispersion are purposely introduced that compensate each other. In particular, the nonlinear phase shift accumulated in the amplifier is compensated by the third-order dispersion of the combination of a fiber stretcher (12) and a grating compressor (16). In the presence of third-order dispersion, an optimal nonlinear phase shift reduces the pulse duration, and enhances the peak power and pulse contrast compared to the pulse produced in linear propagation.

15 Claims, 3 Drawing Sheets

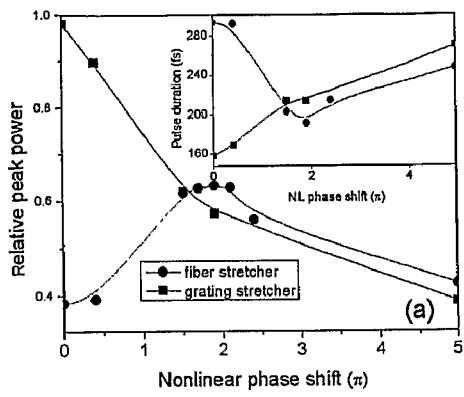
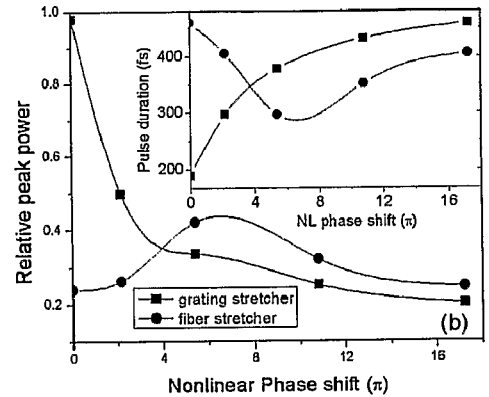
FIG. 3A
FIG. 3B
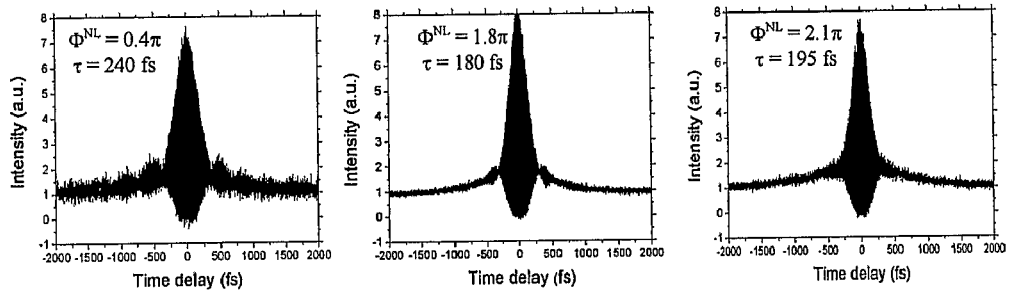
FIG. 4A
FIG. 4B
FIG. 4C
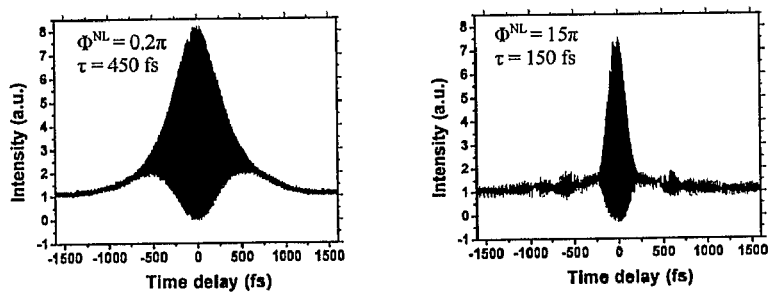
FIG. 5A
FIG. 5B

CHIRPED PULSE FIBER AMPLIFIER

CROSS REFERENCE TO RELATED APPLICATIONS

This application claims the benefit, under 35 U.S.C. 119 (e), of U.S. Provisional Application No. 60/671,078, filed Apr. 14, 2005, which is hereby incorporated by reference in its entirety.

GOVERNMENT SPONSORSHIP STATEMENT

This invention was made with Government support from the National Science Foundation under Contract No. ESC-0217958 and from DARPA (no contract number). The Government has certain rights in the invention.

BACKGROUND OF THE INVENTION

1. Field of the Invention

The present invention relates, in general, to short-pulse fiber amplifiers, and more particularly to a fiber amplifier which employs a pulse stretcher and a pulse compressor that have mismatched dispersion characteristics. The operating parameters of the amplifier are selected such that nonlinear phase shifts accumulated in the amplifier compensate for third order dispersions resulting from the mismatched dispersions of the stretcher and compressor and vice versa.

2. Description of the Background Art

It is well-known that nonlinear phase shifts ($\Phi^{NL}$) can lead to distortion of short optical pulses. In chirped-pulse amplification (CPA), a pulse is stretched to reduce the detrimental nonlinear effects that can occur in the gain medium. After amplification, the pulse is dechirped, ideally to the duration of the initial pulse. The stretching is typically accomplished by dispersively broadening the pulse in a segment of fiber or with a diffraction-grating pair. For pulse energies of microjoules or greater, the dechirping is done with gratings, to avoid nonlinear effects in the presence of anomalous group-velocity dispersion (GVD), which are particularly limiting. The magnitude of the dispersion of a grating stretcher can exactly equal that of the gratings used to dechirp the pulse, to all orders. At low energy, the process of stretching and compression can thus be perfect. At higher energy, some nonlinear phase will be accumulated and this will degrade the temporal fidelity of the amplified pulse. For many applications, $\Phi^{NL}$ (also referred to as the B-integral) must be less than 1 to avoid unacceptable structure on the amplified pulse.

The total dispersion of a fiber stretcher differs from that of a grating pair, and this mismatch results in uncompensated third-order dispersion (TOD), which will distort and broaden the pulse, at least in linear propagation. At wavelengths where the fiber has normal GVD (such as 1 μm), the TOD of the fiber adds to that of the grating pair. Stretching ratios of thousands are used in CPA systems designed to generate microjoule and millijoule-energy pulses, in which case the effects of TOD would limit the dechirped pulse duration to the picosecond range. It has thus become "conventional wisdom" that fiber stretchers are unacceptable in CPA systems and, as a consequence, grating stretchers have become ubiquitous in these devices.

Apart from the difficulty of compensating the cubic phase, a fiber offers major advantages as the pulse stretcher in a CPA system. Coupling light into a fiber is trivial compared to aligning a grating stretcher. The grating stretcher includes an imaging system that can be misaligned, and when misaligned will produce spatial and temporal aberrations in the stretching. A fiber stretcher cannot be misaligned. The fiber is also less sensitive to drift or fluctuations in wavelength or the pointing of the beam that enters the stretcher. Beam-pointing fluctuations may reduce the coupling into the fiber to below the optimal level, whereas they translate into changes in dispersion with a grating pair. Finally, the spatial properties of the beam can influence the stretching with a grating pair, while the pulse stretched in a fiber cannot have spatial chirp, experiences the same stretching at all points on the beam, and exits the fiber with a perfect transverse mode. With fiber amplifiers, there is naturally strong motivation to employ fiber stretchers—grating stretchers detract substantially from the benefits of fiber.

One possible solution to this problem is the combination of a fiber stretcher with a grism pair for dechirping. However, grisms require a challenging synthesis and to date have not found significant use. Recently, significant attention has been devoted to the development of fiber Bragg gratings (FBGs), including chirped FBGs, for use in CPA systems. A chirped fiber grating designed to compensate higher-order dispersion is conceptually the same as a diffraction-grating stretcher, which is matched to the compressor to all orders, but it offers the practical advantages of fiber discussed above. However, it is an experimental fact that the fiber CPA systems that produce the highest pulse energies to date employ ordinary diffraction gratings, not chirped fiber gratings.

In view of the foregoing, there remains a need for a CPA system that can employ a fiber stretcher with a diffraction-grating compressor, but overcomes the cubic phase or third order dispersion problems associated with such arrangements.

SUMMARY OF THE INVENTION

The present invention addresses the foregoing problem through the unexpected discovery that third order dispersions can actually be compensated by nonlinear phase shifts in a fiber amplifier. As a result, the present invention comprises a CPA system that employs a pulse stretcher and a pulse compressor which have dispersion characteristics that are mismatched to one another and thereby cause introduction of third order dispersion (TOD) during operation. While TOD would normally be so detrimental to the operation of the amplifier that it could not function effectively, the inventors have discovered that the TOD can be compensated by a nonlinear phase shift introduced into the system by either the amplifier or a dispersive fiber. The ratio of the nonlinear phase shift to the TOD is selected to reduce and preferably minimize the output pulse width of the compressor, which increases and preferably maximizes the peak power in the pulse.

In the preferred embodiment, the stretcher consists of a segment of single-mode optical fiber. The amplifier is also preferably fiber, at least a section of which is doped with an element that provides the gain, such as ytterbium or erbium. Preferably, the fiber amplifier provides a nonlinear phase shift of π or greater on pulses as they pass through, which is in sharp contrast to previous fiber amplifiers in which the maximum workable phase shift has been assumed to be on the order of 1. The compressor is preferably a dispersive delay line that is selected to generate a predetermined magnitude of TOD during operation with the mismatched stretcher and will most commonly be implemented with a pair of diffraction gratings. In operation, the design of the three stages is such that the nonlinear phase shifts accumulated by the pulse in the amplifier compensate the mismatch of dispersions of the fiber stretcher and grating compressor. For given parameters of the stretcher and compressor, an optimal value of the nonlinear phase shift can be identified, at which value the output pulse has the shortest duration, cleanest shape and highest peak power. The result is a fiber amplifier with a fiber stretcher and a grating compressor that, contrary to previous reports, can perform optimally and actually improves with nonlinearity. In fact, the described amplifier can perform better than analogous devices that employ diffraction gratings for the stretcher, a conclusion that contradicts current belief in the field of short-pulse generation. This behavior contrasts with that of a CPA system with grating stretcher and compressor, where the pulse fidelity decreases monotonically with nonlinear phase shift.

BRIEF DESCRIPTION OF DRAWINGS

The various features of the invention are described in detail below, in conjunction with the accompanying drawings, which are briefly described as follows.

FIGS. 2A and 2B show the results for a fiber stretcher with $\Phi^{NL}=0.4\pi$. FIGS. 2C and 2D show the results for a fiber stretcher with $\Phi^{NL}=1.9\pi$. Finally, FIGS. 2E and 2F are for comparison purposes and show the results for a grating stretcher with $\Phi^{NL}=1.9\pi$.

FIG. 3A illustrates the variation of relative peak power with $\Phi^{NL}$ for a CPA with grating (square symbols), and fiber (round symbols) stretchers. The pulse is stretched to ~46 ps in each case. The inset shows the variation of the pulse duration with $\Phi^{NL}$. FIG. 3B illustrates the same as FIG. 3A but with 400-m stretcher, which stretches to ~140 ps. The lines are only to guide the eye.

FIGS. 4A, 4B and 4C illustrate autocorrelations of amplified and dechirped pulses for experiments conducted using a 100 m fiber stretcher with $\Phi^{NL}=0.4\pi$ for FIG. 4A; $\Phi^{NL}=1.8\pi$ for FIG. 4B; and $\Phi^{NL}=2.1\pi$ for FIG. 4C. The corresponding pulse duration is shown in each graph.

FIGS. 5A and 5B show autocorrelations of amplified and dechirped pulses for experiments conducted using a 400 m fiber stretcher with $\Phi^{NL}=0.2\pi$ for FIG. 5A and $\Phi^{NL}=15\pi$ for FIG. 5B, which occurs with 0.8 mJ pulse energy. The corresponding pulse duration is shown in each panel.

DESCRIPTION OF THE INVENTION

Figure 1:
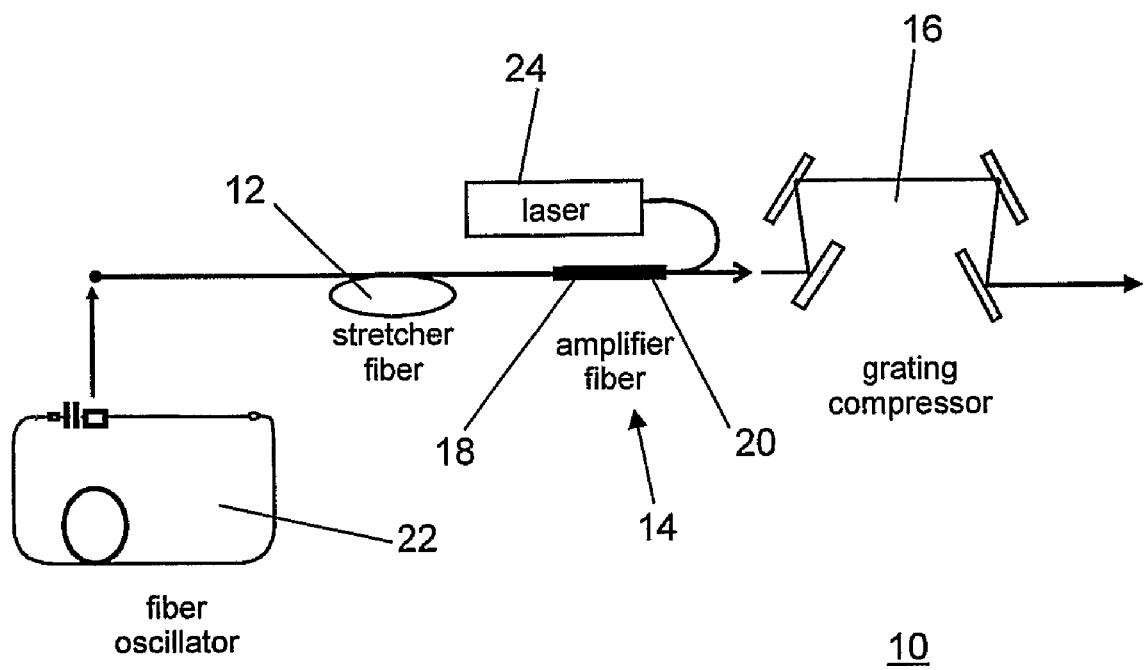
FIG. 1 is a schematic diagram of a CPA system that is constructed in accordance with a preferred embodiment of the present invention.

A chirped-pulse amplifier system 10 for femtosecond-duration optical pulses that is constructed in accordance with a preferred embodiment of the present invention is illustrated in FIG. 1. The CPA system 10 consists of three stages: a pulse stretcher 12, an amplifier 14 and a compressor 16. The stretcher 12 preferably consists of a segment of single-mode optical fiber. The amplifier 14 is also preferably implemented with fiber, at least a first section 18 of which is doped with an element that provides the gain, such as ytterbium or erbium. A second optional section 20 of undoped single mode fiber is preferably included, which can be used to add a selectable amount of nonlinear phase shift to the system 10 for reasons to be discussed shortly. The compressor 16 is preferably a dispersive delay line which will most commonly be implemented with a pair of diffraction gratings. It should be understood that other types of elements could be used for the pulse stretcher 12 and compressor 16, such as grating stretchers, fiber Bragg gratings or photonic-bandgap fibers, however, it is a requirement of the invention that the pulse stretcher 12 and pulse compressor 16 have GVDs that are mismatched to one another to insure generation of TOD.

A Yb fiber oscillator 22 provides a source of pulses to be amplified, although it should be understood that other types of pulse sources may be employed. Finally, a laser diode 24 acts as a pump source for the fiber amplifier 14. The oscillator 22 is connected to the pulse stretcher 12, which is connected to the amplifier 14, which in turn is connected to the pulse compressor 16. During operation, the oscillator 22 generates a series of pulses which are fed into the pulse stretcher 12. The pulse stretcher generates a plurality of broadened pulses that is then fed into the amplifier 14. A plurality of amplified pulses is then generated by the amplifier 14 which is fed into the compressor 16. Finally, the compressor 16 generates a plurality of compressed amplified pulses as output from the system 10.

The crucial feature of the invention is that the three stages are designed so that the nonlinear phase shifts accumulated by the pulse in the amplifier 14 compensate the mismatch of dispersions of the fiber stretcher 12 and grating compressor 16. For given parameters of the stretcher 12 and compressor 16, an optimal value of the nonlinear phase shift can be identified, at which value the output pulse has the shortest duration, cleanest shape and highest peak power. Although an exact formula does not exist for relating the phase shift to the TOD generated by the mismatched components, the following formula can be used to approximate the relationship. For given net GVD, TOD and pulse duration T, the optimal value of the nonlinear phase shift $\Phi^{NL}$ is determined from the approximate formula $$|TOD|=|T\cdot GVD-0.14\Phi^{NL}\cdot T^3|$$

Alternately, for given nonlinear phase shift, the optimal value of TOD can be determined. The nature of the relationship between TOD and nonlinear phase shift means that in the present invention, much higher nonlinear phase shifts than in conventional fiber amplifiers are not only tolerated, but are desirable. Where a conventional amplifier might tolerate a maximum nonlinear phase shift of magnitude 1, the minimum desirable phase shift in the present invention is on the order of $\pi(\approx 3.14)$ and experiments to be discussed later have shown good results with phase shifts of $15\pi$ or more.

It is perhaps remarkable that nonlinear phase shifts and TOD should compensate each other. After all, TOD acting alone produces an anti-symmetric phase, while self-phase modulation alone produces a symmetric phase. A qualitative rationale for the compensation can be made by considering pulse propagation in a fiber stretcher, followed by a nonlinear segment with negligible dispersion and a grating compressor. After stretching, the pulse develops a slightly asymmetric intensity profile owing to the TOD. However, because GVD dominates the stretching, the mean time in the pulse remains close to zero. That is, the pulse energy does not shift in time. This implies that the peak of the pulse moves to slightly earlier (negative) time, while the asymmetric tail associated with TOD extends to later time, for $d^3\phi/d\omega^3>0$. The nonlinear phase shift accumulated by the stretched pulse is then also peaked at slightly negative time, and the temporal phase has negative slope at the center of the pulse. In the compressor, the large quadratic phase from GVD is subtracted off, while the positive TOD counters the negative phase slope. Analogous arguments can be made in the frequency domain, because time is approximately mapped to frequency in highly-chirped pulses. This intuitive explanation is consistent with the numerical results presented below.

Numerical simulations were employed to study CPA with a fiber stretcher, a fiber amplifier and a grating compressor (the key elements of the embodiment of FIG. 1). The parameters of the simulations were taken as those of the experiments described below, to allow comparison of theory and experiment. All the fiber is single-mode fiber (SMF). The input pulses to this system represent the output of the Yb fiber oscillator 22 and were taken to be 150-fs Gaussian pulses with 10.4-nm bandwidth at 1060 nm. The stretcher 12 consists of 100 m of SMF, and analogous results for a 400-m stretcher will be summarized below. The amplifier 14 consists of 1 m of Yb-doped gain fiber, and is followed by 3 m of SMF, where most of the nonlinear phase shift is accumulated. The magnitude of the nonlinear phase shift is adjusted by varying the gain of the amplifier. The compressor 16 is a pair of gratings with 1200 lines/mm, used in a double-pass configuration. The GVD and TOD of the fibers and grating pairs are included in the simulations. Parameters used in the simulations were as follows: nonlinear coefficient $\gamma=4.3$ $kW^{-1}m^{-1}$; GVD coefficient $\beta_2=230$ $fs^2/cm$ and TOD coefficient $\beta_3=254$ $fs^3/cm$. For the grating-pair compressor, $\beta_2=-1.2\times10^5$ $fs^2/cm$ and $\beta_3=4.5\times10^5$ $fs^3/cm$. The nonlinear Schrödinger equations that govern propagation in each section were solved by the standard split-step technique.

After propagation through 100 m of stretcher fiber, the pulse duration was found to be 46 ps. The compressor grating separation is optimized to produce the shortest output pulse at each pulse energy; as expected, the grating separation decreases with increasing $\Phi^{NL}$. All numerical and experimental results reported here are based on the optimal grating separations.

Figure 2:
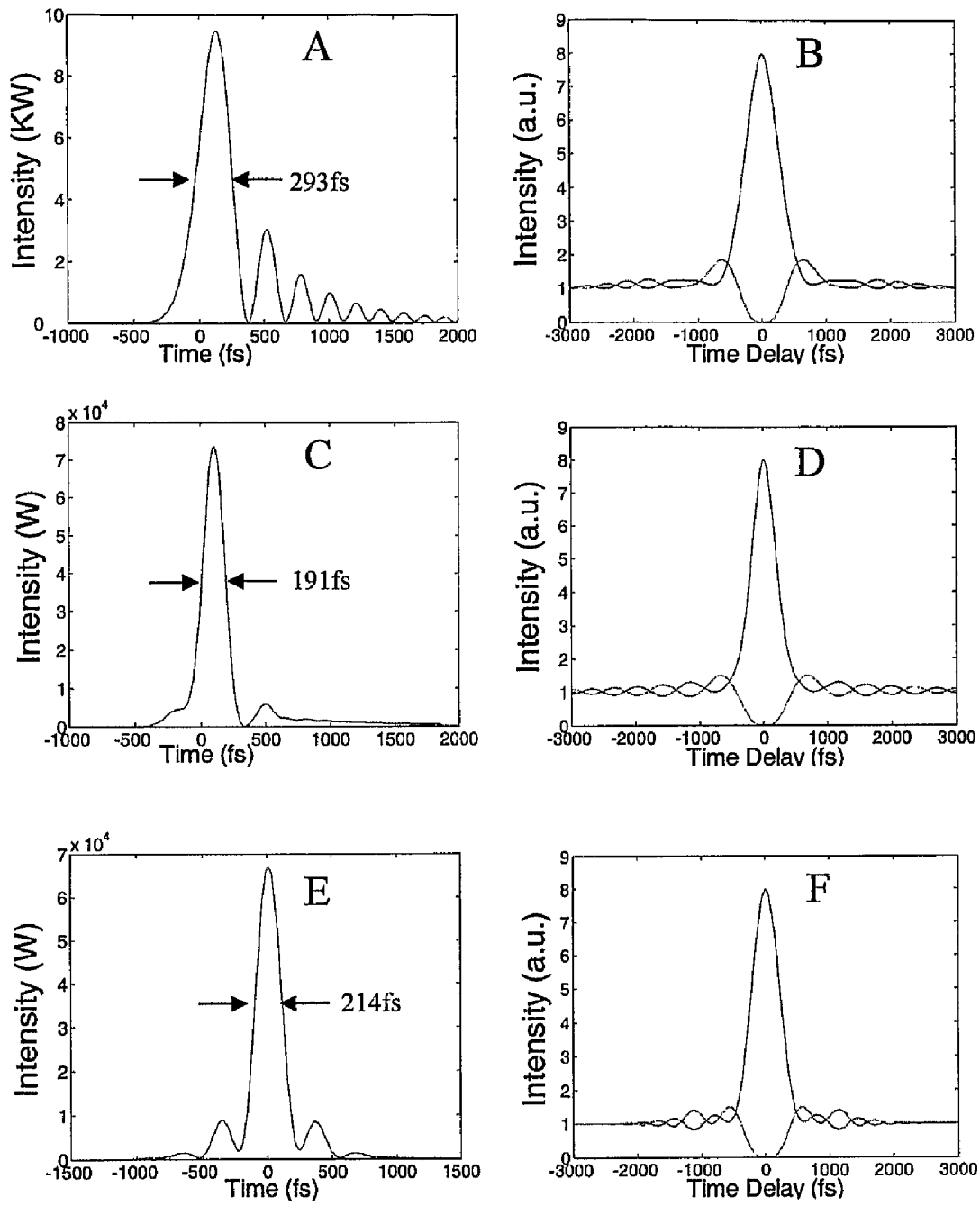
FIGS. 2A-2F are graphs of intensity profiles (A, C and F) and autocorrelation envelopes (B, D and F) obtained from numerical simulations for three different stretcher and phase shift combinations.

As an approximation to linear propagation, the amplifier gain was adjusted to produce a low-energy (4 nJ) pulse. The resulting $\Phi^{NL}=0.4\pi$. The pulse shape after compression illustrated in FIG. 2A exhibits the signature asymmetric broadening and secondary structure from TOD. The fall-width at half-maximum (FWHM) pulse duration has increased to 290 fs, and the peak power is 9.5 kW. The envelopes of the interferometric autocorrelation of the output pulse are shown in FIG. 2B. The autocorrelations are provided because they will be compared to experimental results below.

Increasing the nonlinear phase shift improves the quality of the output pulse. Best results are obtained with amplified pulse energy of 19 nJ, which produces $\Phi^{NL}\approx1.9\pi$. With this nonlinear phase shift, the compressed pulse duration is reduced to 191 fs as illustrated in FIG. 2C, which is within ~25% of the original pulse width. Equally significant is the suppression of the trailing "wing" of the pulse. The resulting peak power is 74 kW; the pulse energy is 5 times larger than in FIG. 2A, but the peak power is 8 times larger owing to the improved pulse quality. The corresponding autocorrelation is shown in FIG. 2D. The power spectrum broadens by less than 5% at the highest energy. Spectral broadening is roughly proportional to the nonlinear phase shift divided by the stretching ratio, so small broadening is expected for $\Phi^{NL}\sim2\pi$ and a stretching ratio of 300. For larger nonlinear phase shifts, the pulse quality degrades. Thus, for a given amount of cubic phase, there is an optimal value of $\Phi^{NL}$. Simulations with the signs of the TOD of the fiber and grating pair reversed produce identical results; a positive (self-focusing) nonlinearity can compensate the effects of either sign of TOD.

For comparison, the best results that can be obtained with a grating stretcher and compressor at the same value of $\Phi^{NL}$ (i.e., the same pulse energy) are illustrated in FIGS. 2E and 2F. The compressed pulse (FIG. 2E) has FWHM duration 214 fs and peak power 67 kW. Thus, for this low stretching ratio and pulse energy, the fiber stretcher offers ~10% improvement over the grating stretcher. However, it is emphasized that the advantage of the fiber stretcher increases with increased stretching ratio and nonlinear phase shift.

The results of a series of similar calculations with varying nonlinear phase shift are summarized in FIG. 3A. The relative peak power is defined as the ratio of the peak power of the output pulse to the ideal peak power that would be obtained in the absence of TOD and nonlinear phase shift. That is, the ideal peak power is that of the output pulse energy with the input pulse intensity profile. With a grating stretcher, the relative peak power decreases monotonically with $\Phi^{NL}$. This trend is well-known and is the reason why $\Phi^{NL}$ is typically limited to 1 in CPA systems. The relative peak power with a fiber stretcher increases until $\Phi^{NL}\sim2\pi$, and then decreases. For $\Phi^{NL}>1.5\pi$ the fiber stretcher performs better than the grating stretcher, albeit by a small margin. The inset in FIG. 3A shows the variation of the FWHM pulse duration with $\Phi^{NL}$.

Analogous results for a 400-m stretcher are shown in FIG. 3B and, together with FIG. 3A, illustrate the scaling of the compensation. The optimal value of $\Phi^{NL}$ increases roughly linearly with the magnitude of the TOD. The benefit of nonlinearity is larger with greater TOD: with a 100-m stretcher the relative peak power is ~50% larger than that obtained in linear propagation $\Phi^{NL}=0$), while with a 400-m stretcher the relative peak power increases by nearly a factor of two. The advantage of a fiber stretcher over a grating stretcher at the optimal value of $\Phi^{NL}$ also increases with increasing TOD. On the other hand, the maximum value of the relative peak power decreases with increasing TOD. With a 400-m stretcher, a 500-nJ pulse produces $\Phi^{NL}=5.4\pi$. The compressed pulse duration is 300 fs (compared to ~500 fs with $\Phi^{NL}=0$, or 380 fs with TOD=0), and with 60% compressor efficiency a peak power of 1 MW is reached. If the TOD is doubled while all other parameters are held constant, the pulse energy reaches 1 µJ, with $\Phi^{NL}=10.8\pi$. The compressed pulse duration is still 300 fs, and the peak power reaches ~2 MW.

Actual experiments were also conducted using a setup similar to the FIG. 1 embodiment of the invention. In the experiments, the Yb fiber laser generates 140-fs pulses with ~12 nm bandwidth at 1060 nm. The pulse is stretched in 100 m of fiber and the amplified and compressed pulses are characterized with an interferometric autocorrelator. FIGS. 4A-4C illustrate the variation of the output pulse with $\Phi^{NL}$. The lowest pulse energy, which was 3 nJ, produced $\Phi^{NL}=0.4\pi$. The autocorrelation (FIG. 4A)) implies a pulse duration of 240 fs. A similar result is obtained with lower signal-to-noise ratio when the repetition rate is reduced. At 3 MHz, the pulse is amplified to 15 nJ, and $\Phi^{NL}=1.8\pi$. The pulse duration (FIG. 4B) decreases to 180 fs, and the secondary structure that arises from TOD diminishes. When the pulse energy increases to 17 nJ ($\Phi^{NL}=2.1\pi$), the pulse duration increases again to 195 fs and the secondary structure begins to increase as well as illustrated in FIG. 4C. The experimental trend agrees qualitatively and semi-quantitatively with the numerical simulations, and exhibits a clear minimum in the pulse duration near the expected optimum value of $\Phi^{NL}$. As expected, the power spectrum broadens slightly at the highest pulse energies.

Initial results obtained with a 400-m stretcher (FIGS. 5A and 5B) demonstrate the scaling to higher energies. The pulse is stretched by a factor of 1200, to 180 ps. In linear propagation, the dechirped pulse is broadened to 450-fs duration. Amplification to nearly the microjoule level impresses a nonlinear phase shift of $10\pi$ to $15\pi$ on the pulse, and results in ~150-fs dechirped pulses. These experiments are clearly consistent with the expected compensation of TOD by SPM.

There is great interest in construction of fiber amplifiers for microjoule and even millijoule-energy pulses, but nonlinearity presents a major challenge in the design of such devices. In the subject invention, nonlinearity is desirable. Amplifiers can be designed to operate with a certain nonlinear phase shift, instead of attempting to avoid nonlinearity entirely. The stretcher and compressor can be designed to operate with a certain TOD, instead of attempting to minimize it. Initial calculations indicate that microjoule-energy pulses of ~300-fs duration can be obtained from amplifiers that use only SMF and millijoule-level pulses may be obtained with multimode fiber or large-mode-area photonic-crystal fiber. Scaling to shorter pulses is also possible. The overwhelming practical benefits of fiber stretchers would recommend their use if the resulting performance was equal to, or even slightly worse than, that obtained with a grating stretcher. With the possibility of better performance, fiber stretchers should become the standard in short-pulse fiber amplifiers. The compensation of nonlinearity by TOD can be implemented in various ways. Fiber Bragg gratings offer an appealing combination of compactness and dispersion control and efforts exist to demonstrate customized chirping of the grating period to compensate higher orders of dispersion. Disadvantages of FBGs include an inherent tradeoff between bandwidth and dispersion, the requirement of expensive (often custom) fabrications, and limited adjustability in dispersion for a given design. These properties contrast with the simplicity and availability of SMF. Of course, the compensation of nonlinearity by TOD described here can be implemented with FBGs: the FBG would be designed to provide a certain amount of TOD, depending on the desired pulse energy. Similar arguments can be made for dechirping the pulse with photonic-bandgap fiber.

To summarize, the present invention demonstrates that nonlinearity and TOD can compensate each other to a large degree in CPA systems. For a given magnitude of TOD, there exists an optimum value of the nonlinear phase shift, for which the output pulse duration is minimized. The output pulse can be significantly shorter and cleaner than in the absence of nonlinearity, and the peak power is correspondingly increased. Extension of this approach to higher pulse energies appears to be straightforward. Significantly, the benefits of this approach increase with nonlinear phase shift, i.e., with pulse energy. Compensation of dispersion beyond third-order by nonlinear phase shifts may also be expected. Finally, the concept described here can be combined with other devices such as fiber Bragg gratings or photonic-bandgap fibers.

Although the invention has be disclosed in terms of a preferred embodiment and variations thereon, it will be understood that numerous other variations and modifications could be made thereto without departing from the scope of the invention as defined in the following claims.

What is claimed is:

1. A fiber amplifier system, comprising:
   a source of optical pulses;
   a pulse stretcher connected to said source for receiving said pulses and generating a plurality of broadened optical pulses;
   a fiber amplifier connected to said pulse stretcher for receiving said broadened optical pulses from said pulse stretcher and generating a plurality of amplified pulses, said fiber amplifier having a gain that is adjustable to introduce a controllable amount of nonlinear phase shift to said amplified pulses; and,
   a pulse compressor connected to said fiber amplifier for receiving said amplified pulses received from said fiber amplifier and generating a plurality of compressed amplified pulses;
   wherein, said pulse stretcher and said pulse compressor are selected to have dispersion characteristics that are mismatched with one another to thereby introduce an amount of third order dispersion into the system and said gain of said fiber amplifier is selected to introduce an amount of nonlinear phase shift having a magnitude of at least $\pi$ to said amplified pulses which compensates for said amount of third order dispersion to thereby produce pulses of short duration and high peak power.

2. The system of claim 1, wherein said stretcher is a segment of optical fiber.

3. The system of claim 2, wherein said compressor is a dispersive delay line.

4. The system of claim 3, wherein said dispersive delay line comprises a pair of diffraction gratings.

5. The system of claim 1, wherein said amounts of third order dispersion and said nonlinear phase shift are selected to minimize the width of said output pulses and thereby maximize a value of peak power in said pulses.

6. The system of claim 1, wherein said system is designed such that the relationship of the magnitude of nonlinear phase shift, $\Phi^{NL}$, is related to the third order dispersion (TOD) approximately by the formula: $|TOD|=|T \cdot GVD - 0.14 \Phi^{NL} \cdot T^3|$ where GVD is the net group velocity dispersion of the system and T is the interval of the pulse.

7. A fiber amplifier system, comprising:
   a source of optical pulses;
   a pulse stretcher connected to said source for receiving said pulses and generating a plurality of broadened optical pulses;
   a fiber amplifier connected to said pulse stretcher for receiving said broadened optical pulses from said pulse stretcher and generating a plurality of amplified pulses, said fiber amplifier including a first section of fiber that is doped to produce gain and a second section of single mode fiber that provides an amount of nonlinear phase shift in said system, said gain being adjustable to introduce a controllable amount of nonlinear phase shift to said amplified pulses; and,
   a pulse compressor connected to said fiber amplifier for receiving said amplified pulses received from said fiber amplifier and generating a plurality of compressed amplified pulses;
   wherein, said pulse stretcher and said pulse compressor are selected to have dispersion characteristics that are mismatched with one another to thereby introduce an amount of third order dispersion into the system and said gain of said fiber amplifier is selected to introduce an amount of nonlinear phase shift to said amplified pulses which compensates for said amount of third order dispersion to thereby produce pulses of short duration and high peak power.

8. A method of compensating for nonlinear phase shifts in short-pulse fiber amplifiers, comprising:
   providing a pulse fiber amplifier system including a source of optical pulses, a pulse stretcher connected to said source, a pulse fiber amplifier connected to pulse stretcher and a pulse compressor connected to said pulse fiber amplifier;
   selecting said pulse stretcher and said pulse compressor to have dispersion characteristics that are mismatched to one another and thereby introduce an amount of third order dispersion into said system; and adjusting a gain of said pulse fiber amplifier to introduce a selected amount of nonlinear phase shift having a magnitude of at least $\pi$ into said system that is sufficient to compensate for said third order dispersion to produce pulses of short duration and high peak power.

9. The method of claim 8, wherein said stretcher is selected to be a segment of optical fiber.

10. The method of claim 9, wherein said compressor is selected to be a dispersive delay line.

11. The method of claim 10, wherein said dispersive delay line is selected to be a pair of diffraction gratings.

12. The method of claim 8, wherein said amount of nonlinear phase shift introduced by said fiber amplifier is adjusted to minimize the width of said output pulses and thereby maximize a value of peak power in said pulses.

13. The method of claim 12, where said phase shift is adjusted by adjusting an amount of pump power applied to said amplifier.

14. The method of claim 8, wherein said system is designed such that the relationship of the magnitude of nonlinear phase shift, $\Phi^{NL}$, is related to the third order dispersion (TOD) approximately by the formula: $|TOD|=T \cdot GVD - 0.14 \Phi^{NL} \cdot T^3|$, where GVD is the net group velocity dispersion of the system and T is the interval of the pulse.

15. A method of compensating for nonlinear phase shifts in short-pulse fiber amplifiers, comprising:

providing a pulse fiber amplifier system including a source of optical pulses, a pulse stretcher connected to said source, a pulse fiber amplifier connected to pulse stretcher and a pulse compressor connected to said pulse fiber amplifier, said fiber amplifier being selected to include a first section of fiber that is doped to produce gain and a second section of single mode fiber that introduces an amount of nonlinear phase shift in said system;

selecting said pulse stretcher and said pulse compressor to have dispersion characteristics that are mismatched to one another and thereby introduce an amount of third order dispersion into said system; and adjusting a gain of said pulse fiber amplifier to introduce a selected amount of nonlinear phase shift into said system that is sufficient to compensate for said third order dispersion to produce pulses of short duration and high peak power.

* * * * *